United States Patent [19]

Horio et al.

[11] Patent Number: 5,662,726

[45] Date of Patent: Sep. 2, 1997

[54] METHOD FOR SEPARATION OF NITROGEN AND CARBON DIOXIDE BY MEANS OF SEPIOLITE AS SEPARATION MEDIUM

[75] Inventors: Masakazu Horio, Konan; Kenzi Suzuki, Aichi-ken; Shinji Tomura; Keiichi Inukai, both of Nagoya, all of Japan

[73] Assignee: Agency of Industrial Science & Technology, Ministry of International Trade & Industry, Tokyo, Japan

[21] Appl. No.: 610,875

[22] Filed: Mar. 5, 1996

[30] Foreign Application Priority Data

Mar. 24, 1995 [JP] Japan ..................... 7-091695

[51] Int. Cl.$^6$ ............................. B01D 53/04
[52] U.S. Cl. .................. 95/139; 95/130; 95/902
[58] Field of Search ............... 95/130, 139, 900, 95/902; 423/230

[56] References Cited

U.S. PATENT DOCUMENTS

| 4,542,002 | 9/1985 | Corma et al. .................. 423/331 |
| 4,933,158 | 6/1990 | Aritsuka et al. ............... 423/230 X |
| 5,531,808 | 7/1996 | Ojo et al. ....................... 95/902 X |

FOREIGN PATENT DOCUMENTS

| 0 298 889 | 1/1989 | European Pat. Off. . |
| 0 652 047 | 5/1995 | European Pat. Off. . |
| 2701220 | 8/1994 | France ................... 423/230 |

OTHER PUBLICATIONS

Mineral Petrog. Mitt., vol. 6, K. Brauner, et al. pp. 120–140, 1956.
Journal Of Clay Science Society Of Japan, vol. 32, No. 3, Y. Fukushima, et al. pp. 177–183, 1992.
Journal Of Clay Science Society Of Japan, vol. 32, No. 3, R. Otsuka, et al. pp. 154–172, 1992.

*Primary Examiner*—Robert Spitzer
*Attorney, Agent, or Firm*—Oblon, Spivak, McClelland, Maier & Neustadt, P.C.

[57] ABSTRACT

A mixed gas consisting of carbon dioxide and nitrogen is separated into the component gases by a method which comprises treating sepiolite with nitric acid, subjecting the treated sepiolite to an ion-exchange treatment thereby exchanging the cationic metal present in the treated sepiolite with Mg ions, heating the sepiolite resulting from the ion-exchange treatment, and exposing the ultimately prepared sepiolite to the mixed gas.

3 Claims, 2 Drawing Sheets

METHOD FOR SEPARATION OF NITROGEN AND CARBON DIOXIDE BY MEANS OF SEPIOLITE AS SEPARATION MEDIUM

BACKGROUND OF THE INVENTION

1. Field of the Invention

Rising atmospheric temperature, i.e. global warming has come to pose a serious social issue in recent years. The carbon dioxide emanating from factories and other industrial facilities is believed to be one of the main causes for this phenomenon. Solving this problem of the global warming will require a technique for recovering and fixing the carbon dioxide which has already been released into the air and a technique for separating and recovering high-concentration, high-temperature carbon dioxide from waste gas sources before it is released into the atmosphere. An organic separation medium is unsuitable for the separation and recovery of hot carbon dioxide because of its unreliable thermal resistance. As a result, ceramics, which are well known for thermal stability, are promising candidates for separation media. This invention aims to provide a method for the separation of nitrogen and carbon dioxide by means of sepiolite, a clayish mineral. It is believed to be capable of contributing immensely to the preservation of the environment on a global scale.

2. Description of the Prior Art

As a means to separate and recover hot carbon dioxide from waste gases such as from factories and plants by the use of a ceramic separation medium, the present inventors previously developed a method which uses sepiolite in its unmodified form or sepiolite which has undergone an ion-exchange treatment with zinc and filed a patent application covering this invention (U.S. application Ser. No. 08/339238). This method resides in separating nitrogen and carbon dioxide by utilizing the fact that these two gases exhibit different adsorption properties to sepiolite. When sepiolite is heated to an elevated temperature exceeding 200° C., it undergoes a phenomenon called folding which causes part of the minute channel-like holes in the sepiolite to collapse. As a result, the area of contact of the sepiolite with gaseous components decreases and the capacity thereof as a separation medium declines proportionately. Practically, therefore, it is desired to develop an improved method for separating hot carbon dioxide and nitrogen under an elevated temperature. This invention provides an improvement which enables sepiolite to maintain its ability as a separation medium (by precluding the minute channel-like holes thereof from collapsing) even at elevated temperatures.

SUMMARY OF THE INVENTION

The present inventors accomplished this invention as a result of a study in search of a method for achieving the object mentioned above.

Specifically, this invention is directed to a method for separating a mixed gas consisting of carbon dioxide and nitrogen into the component gases, which comprises treating sepiolite with nitric acid, subjecting the treated sepiolite to an ion-exchange treatment with a solution containing Mg ions, heating the resultant sepiolite and exposing the ultimately prepared sepiolite to the mixed gas.

Sepiolite in its ideal form has a structure consisting of Si—O tetrahedrons and Mg—O octahedrons, as will be specifically described herein below. Actual samples of sepiolite, however, have part of the Mg moiety thereof replaced by Al, Fe, etc. The sepiolite in this state, when treated with an acid, loses the aforesaid structure swing to partial separation of Mg and other moieties by solution. It can be made to incorporate Mg again by subsequently subjecting it to an ion-exchange treatment with a solution containing Mg ions.

DESCRIPTION OF THE PREFERRED EMBODIMENTS

This invention provides a method for separating nitrogen and carbon dioxide in a hot waste gas by the use of a ceramic separation medium. Since nitrogen and carbon dioxide have nearly equal molecular diameters, it is very difficult to separate these two gases by use a molecular sieve. Another method is required. It is known that nitrogen and carbon dioxide are chemically distinct from each other in that nitrogen is not adsorbed at either acid or base sites, whereas carbon dioxide, which is an acidic gas, is adsorbed at base sites. This leads to the idea of separating nitrogen and carbon dioxide by adsorption of the two gases on a ceramic medium.

Figure 1:
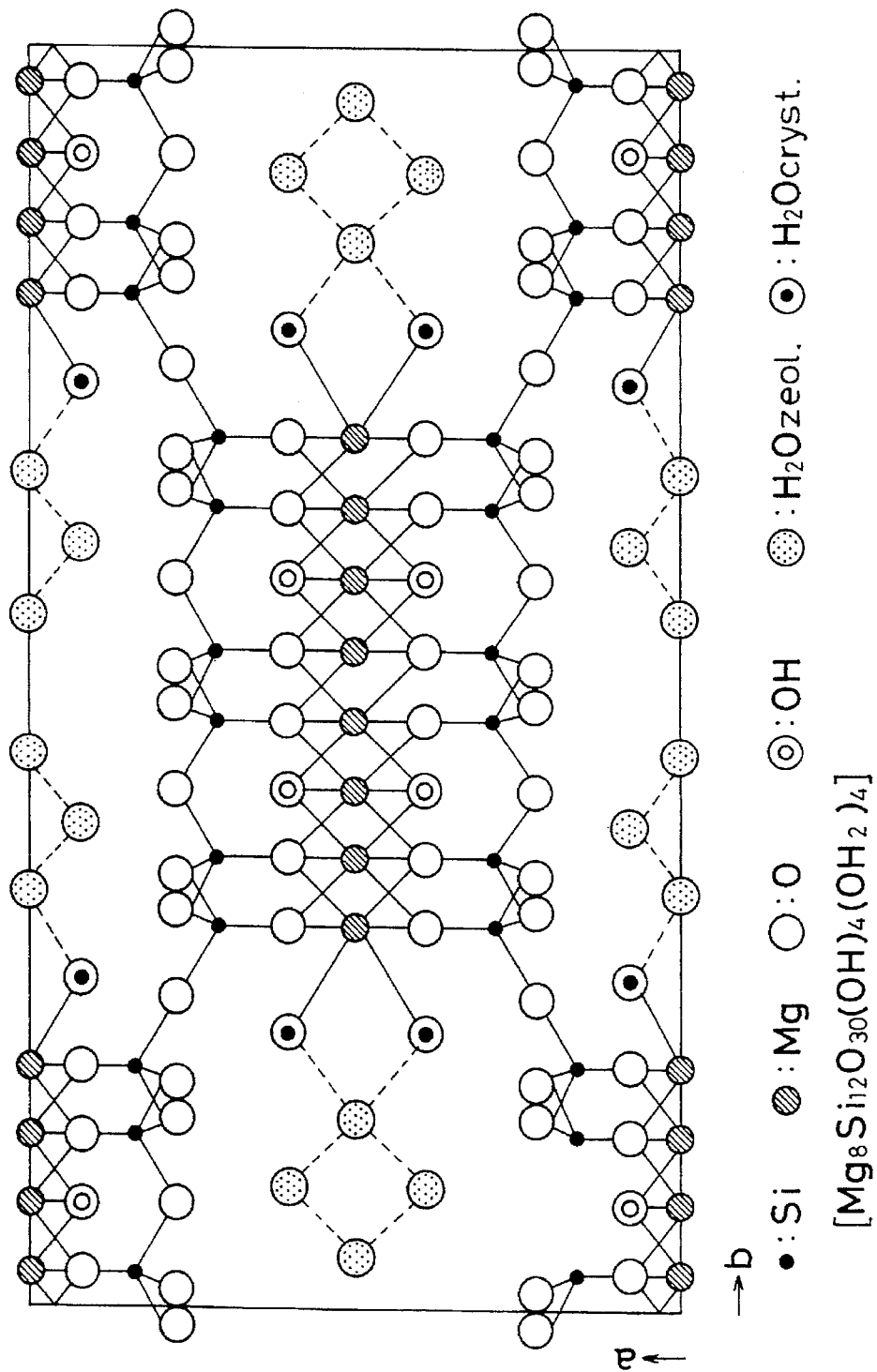
FIG. 1 is a diagram showing a model of the ideal structure of sepiolite crystal projected on an ab plane.

The ceramic separation medium used in the method of this invention is obtained by treating sepiolite, a kind of clayish mineral, with a nitric acid solution, subjecting the treated sepiolite to an ion-exchange treatment with a solution of magnesium ions, and heating the ion-exchanged sepiolite at a temperature in the range of 200° to 800° C. FIG. 1 is a diagram showing a model of the ideal structure of sepiolite crystal projected on an ab plane [Brauner, K. and Preisinger, A., Miner. Petro. Mitt., Vol. 6, pp. 120–140 (1956)]. The chemical formula of this model is [$Mg_8Si_{12}O_{30}(OH)_4(OH_2)_4$.] In the diagram, ● denotes an Si atom, ● an Mg atom, ○ an oxygen atom, ◉ an OH group, ⊕ an $H_2O$ zeol, and ⊙ an $H_2O$ cryst. Since sepiolite assumes a fibrous form extending in the direction perpendicular to the ab plane shown in FIG. 1, namely in the direction of the c axis, FIG. 1 depicts a cross section of sepiolite fiber. In this structure, 2:1 type layers each composed of a Mg—O octahedron sheet nipped at the upper and lower ends thereof by opposed Si—O tetrahedron sheets are inverted to form channels measuring 6.7×13.4 Angstroms. The Mg ions on the wall of each channel formed in consequence of the inversion retain the structure of the Mg—O octahedron stably by severally coordinating two molecules of water in place of oxygen. The Mg ions on the walls of channels can be replaced with divalent cations.

[Ryohei Otsuka, Tasuku Shimoda, Kooya Shimosaka, Hiroshi Nagata, Yasushi Shinohara, Masahiro Shimizu, and Naofumi Sakamoto, Journal of Clay Science Society of Japan, Vol. 32, No. 3, pp. 154–172 (1992)].

Sepiolite contains four kinds of water molecules, i.e. adsorption water, zeolitic water, bound water coordinated to the Mg atom in a 2:1 type octahedral layer, and constitutional water. When the sepiolite is heated, these water molecules are released and the sepiolite undergoes a structural change due to dehydration. A study of the thermogravimetric curve of sepiolite reveals that weight loss by dehydration occurs at four stages, i.e. up to 100° C. (step 1), between 200° and 350° C. (step 2), between 400° and 600° C. (step 3), and between 750° and 820° C. (step 4). The curve of differential thermal analysis includes endothermic peaks corresponding to these areas of weight loss and a sharp exothermic peak in the neighborhood of 830° C. The weight loss at step 1 is ascribed to the elimination of the adsorption water and the zeolitic water, the weight losses at step 2 and step 3 each to the elimination of one half of the total volume of the bound water, and the weight loss at step 4 to the elimination of the constitutional water. The exothermic peak in the neighborhood of 830° C. is due to the transfer of sepiolite to enstatite. The behaviors of elimination of water at these steps are expressed by the following composition formulas.

Step 1:

$$Mg_8Si_{12}O_{30}(OH)_4 4H_2O\ 8H_2O \leftarrow \rightarrow Mg_8Si_{12}O_{30}(OH)_4 4H_2O + 8H_2O$$

Step 2:

$$Mg_8Si_{12}O_{30}(OH)_4\ 4H_2O \leftarrow \rightarrow Mg_8Si_{12}O_{30}(OH)_4\ 2H_2O + 2H_2O$$

Step 3:

$$Mg_8Si_{12}O_{30}(OH)_4\ 2H_2O \rightarrow Mg_8Si_{12}O_{30}(OH)_4\ 2H_2O$$

Step 4:

$$Mg_8Si_{12}O_{30}(OH)_4 \rightarrow Mg_8Si_{12}O_{30} + 2H_2O$$

When sepiolite in a dry state is heated to a temperature exceeding approximately 300° C., it undergoes folding and changes to a folded structure in consequence of a rotation of the 2:1 type layer. The temperature at which the folding occurs varies with such factors as the geographic source of the sepiolite. At times the folding occurs even at 200° C.

As shown in FIG. 1, sepiolite has three kinds of surfaces. The first is the oxygen surface of a tetrahedral silica sheet which resembles the ordinary surface of phyllosilicate. This surface has virtually no activity and functions solely as a surface for physical adsorption. The second is the surface of —Si—OH which exists only on an outer surface severed from bondage and resembles the surface of silica gel. The third is the surface which lies in a channel surface and embraces Mg ions or water molecules bound thereto. This surface in identical in state with a surface which would exist at the terminal of a crystal of phyllosilicate. In sepiolite, countless surfaces of this kind exist along channels. The fact that countless sites of activity exist in sepiolite forms a feature which makes sepiolite distinct from all the other minerals [Yoshiaki Fukushima, Toshie Kitayama, and Kazuo Urabe, Clay Science Society of Japan, Vol. 32, No. 3, pp. 177–183 (1992)].

The method for preparing sepiolite by treating it with nitric acid and then subjecting the treated sepiolite to an ion-exchange treatment with magnesium ions will now be described. The conditions of chemical treatments indicated in the description are meant as examples and may be altered when necessary. They are not meant to limit this invention.

One hundred (100) mL of an aqueous 0.5M nitric acid solution added with 5.0 g of sepiolite is stirred thoroughly and then left standing at rest at normal room temperature for three hours. The time required to treat the sepiolite with nitric acid is ordinarily 1–2 hours.

Then, the resultant reaction solution is centrifuged or filtered to recover the treated sepiolite. The recovered sepiolite is subsequently dispersed thoroughly in 100 mL of an aqueous 1M magnesium nitrate solution to effect an ion-exchange treatment. Since the exchangeable amount of magnesium ions on the walls of channels of sepiolite is 1.57 mmols/g, the concentration and the amount of the aqueous magnesium nitrate solution to be used for the ion-exchange treatment are properly selected so that the aqueous solution will contain magnesium ions at a higher concentration in a larger amount than mentioned above. The solution resulting from the ion-exchange treatment is centrifuged or filtered to recover the treated sepiolite. The treated sepiolite is washed with water, dried, and then heated at a temperature in the range of 200° to 800° C. for two hours. The step of washing with water and the step of drying may be omitted when necessary. The heating conditions for the sepiolite which are determined by the temperature of heating and the period of heating are appropriately selected in ranges so set as to preclude transfer of sepiolite to enstatite.

The method for testing a ceramic substance for ability to separate nitrogen and carbon dioxide will now be described below. When nitrogen or carbon dioxide is brought into contact with a ceramic substance, it is adsorbed on the surface of the ceramic substance and, after a while, is released therefrom. The adsorption proceeds both chemically and physically when the temperature of sepiolite is low. At a high temperature, the adsorption proceeds exclusively chemically. In other words, the physical adsorption is weak and the chemical adsorption is strong. The time between the point the gas is adsorbed on the surface of the ceramic substance and the point the gas is released from the surface, which is called the "retention time," is strongly affected by the ability of the ceramic to adsorb the gas and the ability thereof to release the gas. The fact that the retention time is long suggests that the gas is strongly adsorbed on the surface of the ceramic substance and, therefore, is not easily released therefrom. In contrast, the fact that the retention time is short suggests that the interaction between the gas and the surface of the ceramic substance is weak and the gas is easily released from the surface of the ceramic substance. When the retention time of nitrogen and that of carbon dioxide relative to a ceramic substance are measured and the difference between the two retention times is found, this difference serves as a criterion for judging the ability of the ceramic substance to separate nitrogen and carbon dioxide because the ability grows proportionately to the magnitude of the difference. The measurement of the retention time may be carried out by any method which is capable of measuring the period between gas injection and gas release. This measurement can be carried out easily by a gas chromatograph with TCD using helium as a carrier gas.

Figure 2:
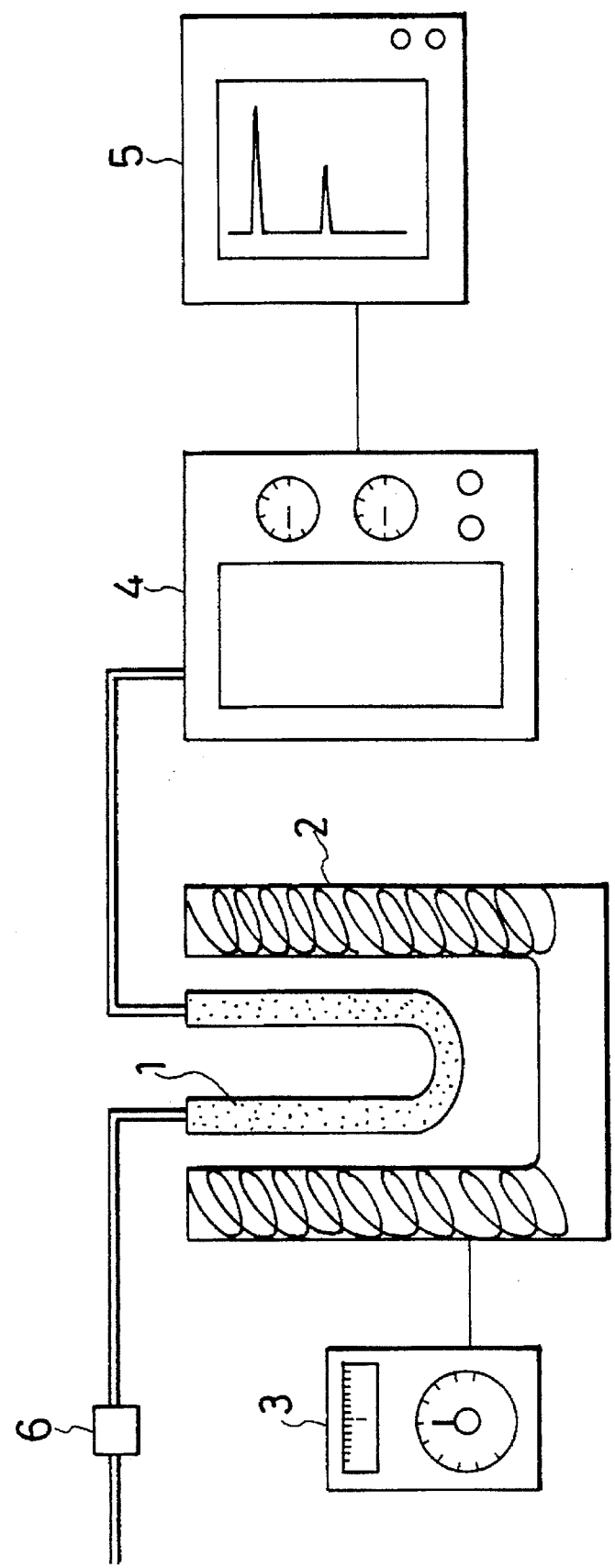
FIG. 2 is a measuring device used for testing a separation medium (sepiolite) of this invention for ability to separate nitrogen and carbon dioxide.

A measuring device for testing a ceramic substance for ability to separate nitrogen and carbon dioxide is schematically shown in FIG. 2. This measuring device comprises a column to be filled with a sample (1), a heating furnace (2), a temperature controlling unit (3), a gas chromatography unit (4), a pen recorder (5), and a nitrogen/carbon dioxide inlet (6). The measurement is started by packing 0.2 to 5.0 g of a separation medium, i.e. sepiolite prepared by a treatment with nitric acid and an ion-exchange treatment with magnesium ions, in a sample packing column, which is a stainless steel pipe 3 mm in inside diameter and about 10 to 100 cm in length. The separating medium in the column is calcined at a temperature in the range of 200° to 800° C. for one to two hours as held in a stream of helium passed at a flow volume of 20 mL/min as a carrier gas.

Subsequently the sample is adjusted to a prescribed measuring temperature, 0.2 ml of a mixed gas of nitrogen and carbon dioxide is injected into the column through the nitrogen and carbon dioxide inlet with the aid of a microsyringe, and the pen recorder is actuated to start recording. The retention times of nitrogen and carbon dioxide are thus determined and the difference between them calculated. The ability of the separating material under test to separate nitrogen and carbon dioxide is rated based on this difference.

The superiority of the method of this invention will be demonstrated below with reference to working examples and comparative experiments. The working examples provide data verifying that the method of this invention permits effective separation of nitrogen and carbon dioxide even at an elevated temperature.

EXAMPLE 1

Sepiolite prepared by a treatment with nitric acid and an ion-exchange treatment with magnesium ions was heat-treated in air at 500° C. for two hours in an electric furnace. Two (2.0) g of the heat-treated sepiolite was placed in the sample column and heat-treated therein at 500° C. for two hours as swept with a stream of helium supplied at a flow volume of 20 mL/min. After this heat treatment, the sample temperature (separation temperature) was set at 300° C. and 0.2 mL of a nitrogen/carbon dioxide mixed gas was introduced into the column. The retention time of nitrogen and that of carbon dioxide were respectively 47 seconds and 164 seconds. Thus, the difference was 117 seconds. The treating conditions and the retention times in this case are shown in Table 1.

EXAMPLES 2 through 4

The mixed gas was treated by following the procedure of Example 1 while changing the sample temperature (separation temperature) to 360° C., 400° C., and 460° C. respectively. The treating conditions and the retention times in this case are shown in Table 1.

EXAMPLE 5

The mixed gas was treated by following the procedure of Example 1 while changing the temperature of the heat treatment performed on the column packed with the sample to 600° C. The treating conditions and the retention times in this case are shown in Table 1.

EXAMPLES 6 through 8

The mixed gas was treated by following the procedure of Example 5 while changing the sample temperature (separation temperature) to 340° C., 400° C., and 460° C. respectively. The treating conditions and the retention times in this case are shown in Table 1.

EXAMPLE 9

Sepiolite prepared by a treatment with nitric acid and an ion-exchange treatment with magnesium ions was heat-treated in air at 400° C. for two hours in an electric furnace. Two-tenths (0.2) g of the heat-treated sepiolite was placed in the sample column and heat-treated therein at 500° C. for two hours as swept with a stream of helium supplied at a flow volume of 20 mL/min. After this heat treatment, the sample temperature (separation temperature) was set at 200° C. and 0.2 mL of a nitrogen/carbon dioxide mixed gas was introduced into the column. The retention time of nitrogen and that of carbon dioxide were respectively 27 seconds and 139 seconds. Thus, the difference was 112 seconds. The treating conditions and the retention times in this case are shown in Table 1.

EXAMPLE 10

The mixed gas was treated by following the procedure of Example 9 while changing the sample temperature (separation temperature) to 260° C. The treating conditions and the retention times in this case are shown in Table 1.

EXAMPLE 11

Sepiolite prepared by a treatment with nitric acid and an ion-exchange treatment with magnesium ions was heat-treated in air at 500° C. for two hours in an electric furnace. Two-tenths (0.2) g of the heat-treated sepiolite was placed in the sample column and heat-treated therein at 600° C. for two hours as swept with a stream of helium supplied at a flow volume of 20 mL/min. After this heat treatment, the sample temperature (separation temperature) was set at 220° C. and 0.2 mL of a nitrogen/carbon dioxide mixed gas was introduced into the column. The retention time of nitrogen and that of carbon dioxide were respectively 27 seconds and 127 seconds. Thus, the difference was 100 seconds. The treating conditions and the retention times in this case are shown in Table 1.

EXAMPLES 12 and 13

The mixed gas was treated by following the procedure of Example 11 while changing the sample temperature (separation temperature) to 240° C. and 300° C. respectively. The treating conditions and the retention times in this case are shown in Table. 1.

EXAMPLE 14

Sepiolite prepared by a treatment with nitric acid and an ion-exchange treatment with magnesium ions was heat-treated in air at 500° C. for two hours in an electric furnace. Two-tenths (0.2) g of the heat-treated sepiolite was placed in the sample column and heat-treated therein at 700° C. for two hours as swept with a stream of helium supplied at a flow volume of 20 mL/min. After this heat treatment, the sample temperature (separation temperature) was set at 200° C. and 0.2 mL of a nitrogen/carbon dioxide mixed gas was introduced into the column. The retention time of nitrogen and that of carbon dioxide were respectively 27 seconds and 105 seconds. Thus, the difference was 78 seconds. The treating conditions and the retention times in this case are shown in Table 1.

EXAMPLES 15 and 16

The mixed gas was treated by following the procedure of Example 14 while changing the sample temperature (separation temperature) to 260° C. and 300° C. respectively. The treating conditions and the retention times in this case are shown in Table 1.

COMPARATIVE EXPERIMENTS 1 and 2

Five (5.0) g of sepiolite heated in air at 500° C. for two hours in an electric furnace was placed in the sample column and heat-treated therein at 500° C. for two hours as swept with a stream of helium supplied at a flow volume of 20 mL/min. After this heat treatment, the sample temperature (separation temperature) was set at 200° C. and 300° C. and 0.2 mL of a nitrogen/carbon dioxide mixed gas was introduced into the column. The retention time of nitrogen and that of carbon dioxide were respectively 21 seconds and 76 seconds and the difference was 55 seconds when the sample temperature was 240° C. The retention time of nitrogen and that of carbon dioxide were respectively 20 seconds and 36 seconds and the difference was 16 seconds when the sample temperature was 300° C. The treating conditions and the retention times in this case are shown in Table 1.

COMPARATIVE EXPERIMENTS 3 and 4

Five (5.0) g of sepiolite heated in air at 500° C. for two hours in an electric furnace was placed in the sample column and heat-treated therein at 600° C. for two hours as swept with a stream of helium supplied at a flow volume of 20 mL/min. After this heat treatment, the sample temperature (separation temperature) was set at 220° C. and 280° C. and 0.2 mL of a nitrogen/carbon dioxide mixed gas was introduced into the column. The retention time of nitrogen and that of carbon dioxide were respectively 21 seconds and 109 seconds and the difference was 88 seconds when the sample temperature was 220° C. The retention time of nitrogen and that of carbon dioxide were respectively 21 seconds and 55 seconds and the difference was 34 seconds when the sample temperature was 280° C. The treating conditions and the retention times in this case are shown in Table 1.

COMPARATIVE EXPERIMENTS 5 and 6

Four-tenths (0.4) g of sepiolite heated in air at 500° C. for two hours in an electric furnace was placed in the sample column and heat-treated therein at 500° C. for two hours as swept with a stream of helium supplied at a flow volume of 20 mL/min. After this heat treatment, the sample temperature (separation temperature) was set at 200° C. and 260° C. and 0.2 mL of a nitrogen/carbon dioxide mixed gas was introduced into the column. The retention time of nitrogen and that of carbon dioxide were respectively 27 seconds and 60 seconds and the difference was 33 seconds when the sample temperature was 200° C. The retention time of nitrogen and that of carbon dioxide were respectively 26 seconds and 34 seconds and the difference was 8 seconds when the sample temperature was 260° C. The treating conditions and the retention times in this case are shown in Table 1.

COMPARATIVE EXPERIMENTS 7 and 8

Four-tenths (0.4) g of sepiolite heated in air at 500° C. for two hours in an electric furnace was placed in the sample column and heat-treated therein at 600° C. for two hours as swept with a stream of helium supplied at a flow volume of 20 mL/min. After this heat treatment, the sample temperature (separation temperature) was set at 180° C. and 280° C. and 0.2 mL of a nitrogen/carbon dioxide mixed gas was introduced into the column. The retention time of nitrogen and that of carbon dioxide were respectively 27 seconds and 93 seconds and the difference was 66 seconds when the sample temperature was 180° C. The retention time of nitrogen and that of carbon dioxide were respectively 26 seconds and 34 seconds and the difference was 8 seconds when the sample temperature was 280° C. The treating conditions and the retention times in this case are shown in Table 1.

TABLE 1

| | Heating A | | Sample | | Heating B | |
|---|---|---|---|---|---|---|
| | Temperature (°C.) | Hour (h) | Kind | Volume (g) | Temperature (°C.) | Hour (h) |
| Example | | | | | | |
| 1 | 500 | 2 | Mg ion exchanged sepiolite | 2.0 | 500 | 2 |
| 2 | 500 | 2 | Mg ion exchanged sepiolite | 2.0 | 500 | 2 |
| 3 | 500 | 2 | Mg ion exchanged sepiolite | 2.0 | 500 | 2 |
| 4 | 500 | 2 | Mg ion exchanged sepiolite | 2.0 | 500 | 2 |
| 5 | 500 | 2 | Mg ion exchanged sepiolite | 2.0 | 600 | 2 |
| 6 | 500 | 2 | Mg ion exchanged sepiolite | 2.0 | 600 | 2 |
| 7 | 500 | 2 | Mg ion exchanged sepiolite | 2.0 | 600 | 2 |
| 8 | 500 | 2 | Mg ion exchanged sepiolite | 2.0 | 600 | 2 |
| 9 | 400 | 2 | Mg ion exchanged sepiolite | 0.2 | 500 | 2 |
| 10 | 400 | 2 | Mg ion exchanged sepiolite | 0.2 | 500 | 2 |
| 11 | 500 | 2 | Mg ion exchanged sepiolite | 0.2 | 600 | 2 |
| 12 | 500 | 2 | Mg ion exchanged sepiolite | 0.2 | 600 | 2 |
| 13 | 500 | 2 | Mg ion exchanged sepiolite | 0.2 | 600 | 2 |
| 14 | 500 | 2 | Mg ion exchanged sepiolite | 0.2 | 700 | 2 |
| 15 | 500 | 2 | Mg ion exchanged sepiolite | 0.2 | 700 | 2 |
| 16 | 500 | 2 | Mg ion exchanged sepiolite | 0.2 | 700 | 2 |
| Comparative Experiement | | | | | | |
| 1 | 500 | 2 | Sepiolite | 5.0 | 500 | 2 |
| 2 | 500 | 2 | Sepiolite | 5.0 | 500 | 2 |
| 3 | 500 | 2 | Sepiolite | 5.0 | 600 | 2 |
| 4 | 500 | 2 | Sepiolite | 5.0 | 600 | 2 |
| 5 | 500 | 2 | Sepiolite | 0.4 | 500 | 2 |
| 6 | 500 | 2 | Sepiolite | 0.4 | 500 | 2 |
| 7 | 500 | 2 | Sepiolite | 0.4 | 600 | 2 |
| 8 | 500 | 2 | Sepiolite | 0.4 | 600 | 2 |

| | Sample Temperature (°C.) | Introducing volume of mixed gas (ml) | Retention Time (Sec.) | | |
|---|---|---|---|---|---|
| | | | $N_2$ | $CO_2$ | Difference |
| Example | | | | | |
| 1 | 300 | 0.2 | 47 | 164 | 117 |
| 2 | 360 | 0.2 | 46 | 73 | 27 |

TABLE 1-continued

|    |     |     |    |     |     |
|----|-----|-----|----|-----|-----|
| 3  | 400 | 0.2 | 46 | 60  | 14  |
| 4  | 460 | 0.2 | 46 | 51  | 5   |
| 5  | 300 | 0.2 | 46 | 163 | 117 |
| 6  | 340 | 0.2 | 46 | 94  | 48  |
| 7  | 400 | 0.2 | 45 | 62  | 17  |
| 8  | 460 | 0.2 | 45 | 52  | 7   |
| 9  | 200 | 0.2 | 27 | 139 | 112 |
| 10 | 260 | 0.2 | 27 | 47  | 20  |
| 11 | 220 | 0.2 | 27 | 127 | 100 |
| 12 | 240 | 0.2 | 27 | 47  | 20  |
| 13 | 300 | 0.2 | 27 | 34  | 7   |
| 14 | 200 | 0.2 | 27 | 105 | 78  |
| 15 | 260 | 0.2 | 26 | 42  | 16  |
| 16 | 300 | 0.2 | 26 | 32  | 6   |

Comparative Experiment

|   |     |     |    |     |    |
|---|-----|-----|----|-----|----|
| 1 | 240 | 0.2 | 21 | 76  | 55 |
| 2 | 300 | 0.2 | 20 | 36  | 16 |
| 3 | 220 | 0.2 | 21 | 109 | 88 |
| 4 | 280 | 0.2 | 21 | 55  | 34 |
| 5 | 200 | 0.2 | 27 | 60  | 33 |
| 6 | 260 | 0.2 | 26 | 34  | 8  |
| 7 | 180 | 0.2 | 27 | 93  | 66 |
| 8 | 280 | 0.2 | 26 | 32  | 6  |

In Table 1, "heating A" represents the heating in air performed in an electric furnace and "heating B" represents the heating performed on the sample placed in the sample column with the sample swept with a stream of helium supplied at a rate of 20 mL/min.

The working examples and the comparative experiments set out above indicate that the sepiolite which had undergone a treatment with nitric acid and an ion-exchange treatment with magnesium ions was superior to the sepiolite which had undergone no treatment in terms of the ability to separate nitrogen and carbon dioxide. Comparison of Example 11 and Comparative Experiment 3, for example, reveals that the weight of the sample was 0.2 g in the former and 5.0 g in the latter and the retention time was 100 seconds in the former and 88 seconds in the latter, indicating no substantial difference. The fact that the amount of sample in the comparative experiment was 25 times that in the working example indicates that the ability to separate in the working example far exceeded that in the comparative experiment.

The same relation is found between Example 1 and Comparative Experiment 2.

In view of the amounts of sample and the magnitudes of heating temperature, the working examples and the comparative experiments set out herein justify the conclusion that the method of this invention for the separation of nitrogen and carbon dioxide is excellent.

What is claimed is:

1. A method for separating carbon dioxide and nitrogen from a mixed gas consisting of carbon dioxide and nitrogen, which comprises treating sepiolite with nitric acid, subjecting the treated sepiolite to an ion-exchange treatment with Mg ions, heating the sepiolite resulting from said ion-exchange treatment to form a heat treated sepiolite, and exposing said heat treated sepiolite to said mixed gas.

2. The method according to claim 1, wherein said heating is effected at a temperature in the range of 200° to 800° C.

3. The method according to claim 1, wherein said treating with nitric acid is carried out for a period in the range of one to two hours.

* * * * *